Patented Dec. 2, 1952

2,620,333

UNITED STATES PATENT OFFICE 2,620,333

MONOAZO DYESTUFFS

Willy Widmer, Bottmingen, Ernst Reich, Neuewelt, near Basel, and Arthur Buehler, Rheinfelden, Switzerland, assignors to Ciba Limited, Basel, Switzerland, a Swiss firm No Drawing. Application August 29, 1949, Serial No. 113,026. In Switzerland September 3, 1948

1 Claim. (Cl. 260—202)

According to this invention, valuable new monoazo dyestuffs are made by coupling diazotized 4-nitro-6-acetylamino-2-amino-1-hydroxybenzene or 4-nitro-6-phthaloylamino-2-amino-1-hydroxybenzene with 2:6-dihydroxynaphthalene.

The diazotization of the 4-nitro-6-acetylamino-2-amino-1-hydroxybenzene or 4-nitro-6-phthaloylamino-2-amino-1-hydroxybenzene may be carried out by the usual known methods, for example, with the aid of a mineral acid, especially hydrochloric acid and sodium nitrite.

The coupling is advantageously conducted in an alkaline medium, preferably in a medium rendered alkaline with an alkali metal hydroxide or an alkaline earth metal hydroxide.

The invention also includes a modification of the process described above, by which the dyestuffs can be obtained by treating the monoazo dyestuff of the formula

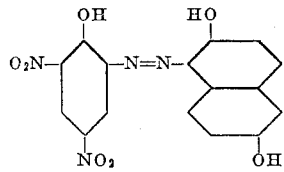

to reduce to an amino group the nitro group in ortho position to the hydroxyl group, and then converting the resulting amino group into the acetylamino group or the phthaloylamino group.

The monoazo dyestuff of the above formula used as starting material in this modification of the process can be prepared by coupling diazotized 4:6-dinitro-2-amino-1-hydroxybenzene with 2:6-dihydroxynaphthalene. The reduction of the dinitro-azo dyestuff to the nitro-amino dyestuff is conducted under conditions such that neither the azo group nor the second nitro group is attacked.

For this purpose, there are suitable, for example, alkali metal sulfides or alkali metal hydrosulfides. Conversion of the amino group into the acetylamino group or phthaloylamino group in the dyestuff so obtained may be brought about, for example, by means of acetic acid anhydride or phthalic acid anhydride.

The new monoazo dyestuffs obtainable by either of the foregoing processes correspond to the formula

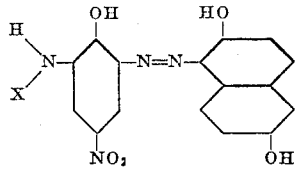

in which X represents the radical $CH_3CO-$ or the radical

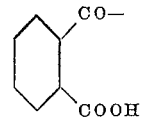

The new dyestuffs can be used for dyeing or printing a wide variety of materials. They can be treated with agents yielding metal, especially agents yielding chromium. The treatment with an agent yielding metal may be conducted by known methods in substance or on the fiber or in the dyebath. Treatment with an agent yielding chromium in substance may be carried out, for example, with a salt of trivalent chromium. In this connection, however, it must be stated that at the high temperatures (100° C. or higher) usually necesary for this reaction, it is often disadvantageous to work in a mineral acid medium, because the acylamino group present in the dyestuff molecule may be hydrolyzed under such conditions. In such cases it is advisable to use as an agent yielding chromium a chromium salt of a weak acid such as formate or acetate. Especially valuable results are obtained when the dyestuffs are treated on the fiber or in the dyebath with agents yielding metal, especially agents yielding chromium. In this way, very valuable dyeings can be produced on materials of animal origin, such as leather, silk, and above all wool, but also on artificial fibers of superpolyamides or superpolyurethanes. Treatment on the fiber may be conducted, for example, by the known after-chroming process. In the case of the dyestuff prepared from diazotized 4-nitro-6-acetylamino-2-amino-1-hydroxybenzene the treatment with agents yielding chromium may be carried out with advantage by the single bath chroming process.

The following examples illustrate the invention, the parts and percentages being by weight unless otherwise stated and the relationship of parts by weight to parts by volume being the same as that of the kilogram to the liter.

Example 1

21.1 parts of 4-nitro-6-acetylamino-2-amino-1-hydroxybenzene are suspended in 100 parts of water and, after the addition of 20 parts of hydrochloric acid of 30 per cent. strength and ice, diazotized in the usual manner at 5–10° C. with 25 parts by volume of a 4N-solution of sodium nitrite. The suspension of the diazo compound is neutralized by the addition of sodium carbonate and then filtered. It is then introduced into a solution, cooled to 0° C. by the addition of ice, of 17 parts of 2:6-dihydroxynaphthalene in 70 parts by volume of a 2N-solution of sodium hydroxide. The whole is stirred until coupling ceases, and the precipitated dyestuff which corresponds to the formula

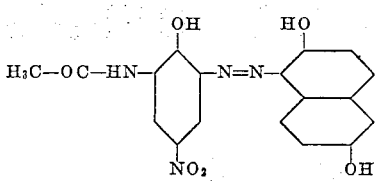

is separated by filtration and washed with a dilute solution of sodium chloride. The dry dyestuff dissolves in hot water with a grey-violet coloration, in dilute hot sodium carbonate solution with an olive-green coloration and in concentrated sulfuric acid with a violet-red coloration, and dyes wool by the after-chroming process and the single bath chroming process olive-green tints which are fast to light and washing.

A valuable dyestuff which corresponds to the formula

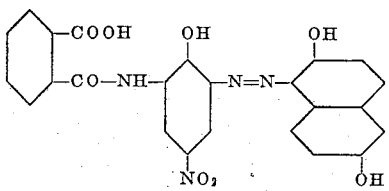

is also obtained by using in this example 31.7 parts of 4-nitro-6-phthaloylamino-2-amino-1-hydroxybenzene, instead of 21.1 parts of 4-nitro-6-acetylamino-2-amino-1-hydroxybenzene.

*Example 2*

A dyebath is prepared with 4000 parts of water, 3 parts of a mixture consisting of 1.5 parts of potassium chromate and 1.5 parts of ammonium sulfate, 10 parts of cryst. sodium sulfate, and 1 part of the dyestuff obtainable as described in Example 1, first paragraph. 100 parts of well wetted wool are entered into the dyebath at 60° C., the temperature is raised to the boil in the course of 30 minutes, and boiling is continued for 45 minutes. 0.5 part of acetic acid of 40 per cent. strength is then added and the whole is boiled for a further 45 minutes. The wool is dyed a fast olive-green tint.

Having thus described the invention, what is claimed is:

The monoazo dyestuff of the formula

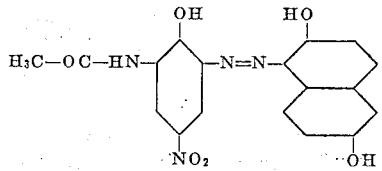

WILLY WIDMER.
ERNST REICH.
ARTHUR BUEHLER.

REFERENCES CITED

The following references are of record in the file of this patent:

UNITED STATES PATENTS

| Number | Name | Date |
|---|---|---|
| 933,842 | Jansen et al. | Sept. 14, 1909 |
| 2,353,675 | Knecht et al. | July 18, 1944 |

FOREIGN PATENTS

| Number | Country | Date |
|---|---|---|
| 3,182 | Great Britain | 1903 |
| 17,792 | Great Britain | 1903 |